United States Patent [19]

Katagiri et al.

[11] Patent Number: 5,144,511
[45] Date of Patent: Sep. 1, 1992

[54] MAGNETIC TAPE CASSETTE

[75] Inventors: Shingo Katagiri; Shigeru Nishiyama; Hiroyuki Tahara, all of Kanagawa, Japan

[73] Assignee: Fuji Photo Film Co., Ltd., Kanagawa, Japan

[21] Appl. No.: 746,533

[22] Filed: Aug. 19, 1991

[30] Foreign Application Priority Data

Aug. 20, 1990 [JP] Japan .................. 2-86966[U]
Aug. 20, 1990 [JP] Japan .................. 2-86967[U]
Oct. 12, 1990 [JP] Japan .................. 2-107396[U]

[51] Int. Cl.$^5$ ............................................. G11B 23/087
[52] U.S. Cl. ........................................ 360/132; 242/198
[58] Field of Search ................ 360/132; 242/198–199

[56] References Cited

U.S. PATENT DOCUMENTS

| | | | |
|---|---|---|---|
| 4,576,345 | 3/1986 | Koken et al. | 242/198 |
| 4,660,784 | 4/1987 | Sumida et al. | 360/132 X |
| 4,673,145 | 6/1987 | Emori | 360/132 X |
| 4,714,213 | 12/1987 | Watanabe et al. | 360/132 X |
| 4,771,351 | 9/1988 | Tanaka et al. | 360/132 |
| 4,884,159 | 11/1989 | Satoh | 360/132 |

*Primary Examiner*—John H. Wolff
*Attorney, Agent, or Firm*—Sughrue, Mion, Zinn, Macpeak & Seas

[57] ABSTRACT

A cassette casing for a magnetic tape cassette has a casing body and a slider member mounted for sliding motion between a closed position and an open position. The slider member has a pair of guide grooves formed on the outer surface thereof remote from the casing body and extending from a first end of the cassette casing toward the other end, each of the guide grooves having first and second engaging holes which are formed on the bottom of the guide groove to extend through the slider member and open to the inner surface of the same and are spaced from each other in the longitudinal direction of the guide groove. The casing body is provided with a pair of locking projections each of which is resiliently urged toward one of the guide grooves from the inner surface of the slider member and is adapted to be selectively engaged with the first and second engaging holes so that its tip portion projects into the guide groove. The locking projections is disengaged from the engaging holes by a pair of lock release projections which are provided on a surface of a cassette deck and slide along the guide grooves when the magnetic tape cassette is loaded in the cassette deck. The outer surface of the slider member which is opposed to the surface of the cassette deck on which the lock release projections are provided is cut obliquely at each side edge portion thereof from a portion close to the guide groove on the outer side thereof to the side edge.

6 Claims, 6 Drawing Sheets

MAGNETIC TAPE CASSETTE

BACKGROUND OF THE INVENTION

1. Field of the Invention

This invention relates to a magnetic tape cassette, and more particularly to a magnetic tape cassette comprising a digital audio tape and a cassette casing for accommodating the digital audio tape having a slider member which is moved to an open position to give access to the tape in response to loading the cassette in a recording and/or reproduction system.

2. Description of the Prior Art

There has been known a DAT cassette comprising a digital audio tape and a cassette casing for accommodating the digital audio tape. The cassette casing for the DAT cassette has a slider member which is slidable between an open position and a closed position. The slider member is normally spring-urged to the closed position and held in the closed position by a slider lock means. When the cassette is loaded in a cassette deck, a lock release member provided in the cassette deck releases the slider member from the slider lock means and pushes the slider member relative to casing body to the open position, where the slider lock member again engages with the slider member to lock it in the open position.

More particularly, the slider member is mounted on the lower side of the casing body to be slidable relative to the casing body in the direction of insertion of the DAT cassette into the cassette deck. The slider member has a pair of guide grooves extending from the leading end of the slider member to an intermediate portion thereof, and the cassette deck is provided with a pair of lock release projections. When the DAT cassette is inserted into the cassette deck, the lock release projections are respectively received in the guide grooves and move along the guide grooves relative to the slider member. First and second engaging holes are provided in the bottom of each of the guide grooves spaced from each other in the longitudinal direction of the guide groove. A pair of lock members each having a locking projection which is adapted to be engaged with the first and second engaging holes are provided on the casing body and are resiliently urged toward the upper surface of the slider member. When the slider member is in the closed position, the locking projections of the lock members are engaged with the first engaging holes of the slider member, whereby the slider member is held in the closed position.

When the lock release projections abut against the locking projections of the lock members as the DAT cassette is inserted into the cassette deck, the lock release projections push upward the locking projections to disengage them from the first engaging holes, and thereafter the lock release projections abut against the end faces of the respective guide grooves. Since the locking projections have been disengaged from the first engaging holes of the slider member, the slider member is slid relative to the casing body toward the open position as the DAT cassette is further inserted into the cassette deck while the locking projections slide along the upper surface of the slider member.

When the DAT cassette is completely inserted into the cassette deck, the slider member reaches the open position and the locking projections are brought into engagement with the second engaging holes to hold the slider member in the open position.

However, in the conventional DAT cassettes, much trouble has occurred in opening and closing of the slider member.

For example, in the conventional DAT cassettes, the lower surface of the slider member and the upper surface of the cassette deck which is opposed to the lower surface of the slider member and on which the lock release projections are provided are both designed to be flat. However, when the latter surface is concave in the direction of width of the DAT cassette, i.e., when both side portions of the latter surface are higher than that of the middle portion, for some reason of production, both side portions of the slider member ride on the side portions of the surface of the cassette deck and the distance between the locking projections and the lock release projections is enlarged, whereby the locking projections cannot be lifted by an amount sufficient to disengage the locking projections from the first or second engaging holes.

Further, in the conventional DAT cassette, the locking projections can be caught by the edges of the engaging holes, which prevents insertion of the DAT cassette into the cassette deck and/or release of the slider member from the lock members.

SUMMARY OF THE INVENTION

In view of the foregoing observations and description, the primary object of the present invention is to provide a DAT cassette in which the slider member can be surely released from the locking members and can be surely slid to the open position in response to loading the DAT cassette in the cassette deck, thereby permitting smooth loading of the DAT cassette in the cassette deck.

The DAT cassette in accordance with the present invention is characterized in that the surface of the slider member which is opposed to the surface of the cassette deck on which the lock release upper projections are provided is cut obliquely at each side edge portion thereof from a portion close to the guide groove on the outer side thereof to the side edge, whereby an inclined surface is formed on each side edge portion of the slider member.

By virtue of the inclined surfaces on the side edge portions of the slider member, the lock release projections 12 can enter the guide grooves to a sufficient depth and successfully disengage the locking projections 6a from the first or second engaging holes even if the upper surface of the cassette deck on which the lock release projections are provided is concave.

DESCRIPTION OF THE PREFERRED EMBODIMENT

Figure 11:
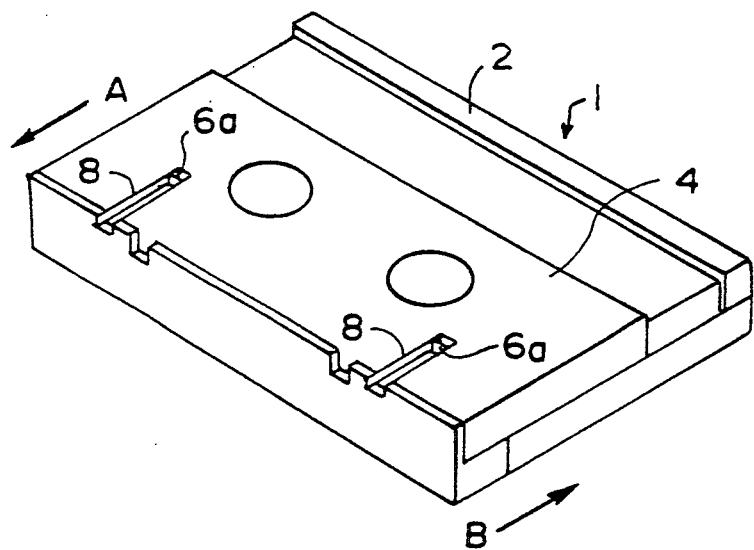
FIG. 11 is a perspective bottom view of a conventional DAT cassette.

FIG. 11 is a perspective bottom view showing a typical DAT cassette to which the present invention is applied as viewed from below.

The DAT cassette comprises a digital audio tape (not shown) and a cassette casing 1 for accommodating the digital audio tape. The cassette casing 1 comprises a casing body 2 and a slider member 4 which is mounted on the bottom of the casing body 2 to be slidable between an open position and a closed position. The slider member 4 is normally spring-urged to the closed position in the direction of arrow A and held in the closed position by a pair of lock members 6. The slider member 4 has a pair of guide grooves 8 which extend from the leading end of the slider member 4 to an intermediate portion thereof and are spaced from each other in the direction of width of the slider member 4. The DAT cassette is inserted into a cassette deck (not shown) in the direction of the arrow A.

Figure 12:
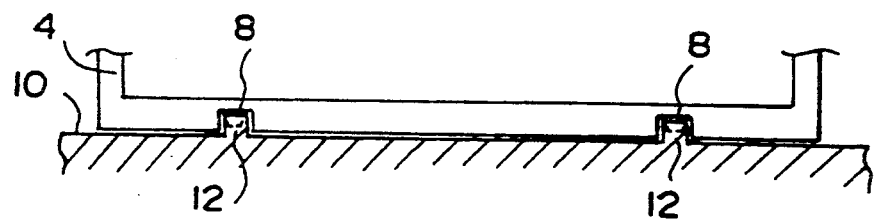
FIG. 12 is fragmentary cross-sectional view showing the relation between the locking projections and the lock release projections.
Figure 13A:
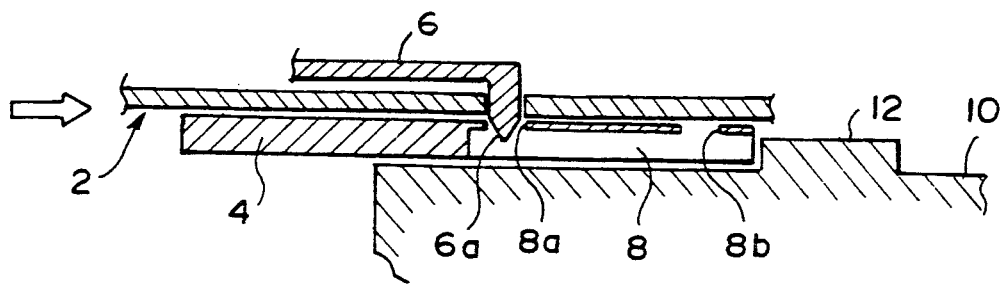
FIGS. 13A to 13C are fragmentary cross-sectional views for illustrating the operation of the DAT cassette.

As shown in FIG. 12, the cassette deck is provided with a pair of lock release projections 12 provided on a flat surface 10 spaced from each other in the direction of width of the DAT cassette by the same distance as the space between the guide grooves 8. When the DAT cassette is inserted into the cassette deck, the lock release projections 12 are respectively received in the guide grooves 8 as shown in FIG. 12 and move along the guide grooves 8 relative to the slider member 4. First and second engaging holes 8a and 8b are provided in the bottom of each of the guide grooves 8 spaced from each other in the longitudinal direction of the guide groove 8. A pair of lock members 6 each having a locking projection 6a which is adapted to be engaged with the first and second engaging holes 8a and 8b are provided on the casing body 2 and are resiliently urged toward the upper surface of the slider member 4. When the slider member 4 is in the closed position, the locking projections 6a of the lock members 6 are engaged with the first engaging holes 8a of the slider member 4, whereby the slider member 4 is held in the closed position (FIG. 13A).

Figure 13B:
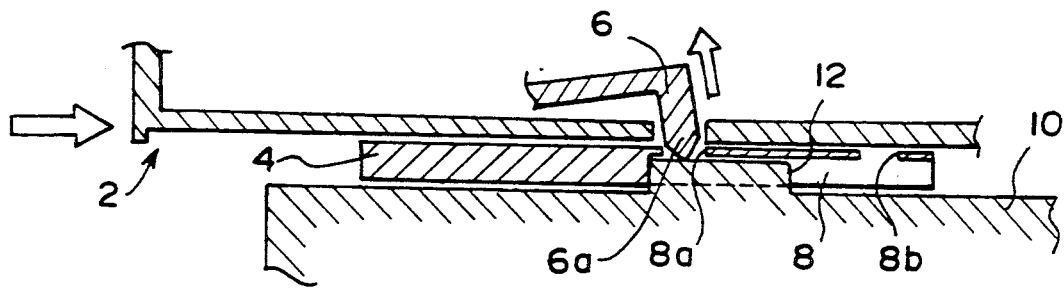

When the lock release projections 12 abut against the locking projections 6a of the lock members 6 as the DAT cassette is inserted into the cassette deck, the lock release projections 12 push upward the locking projections 6a to disengage them from the first engaging holes 8a (FIG. 13B), and thereafter the lock release projections 12 abut against the end faces of the respective guide grooves 8. Since the locking projections 6a have been disengaged from the first engaging holes 8a of the slider member 4, the slider member 4 is slid relative to the casing body 2 toward the open position in the direction of arrow B (FIG. 13C) as the DAT cassette is further inserted into the cassette deck while the locking projections 6a slide along the upper surface of the slider member 4.

Figure 13C:
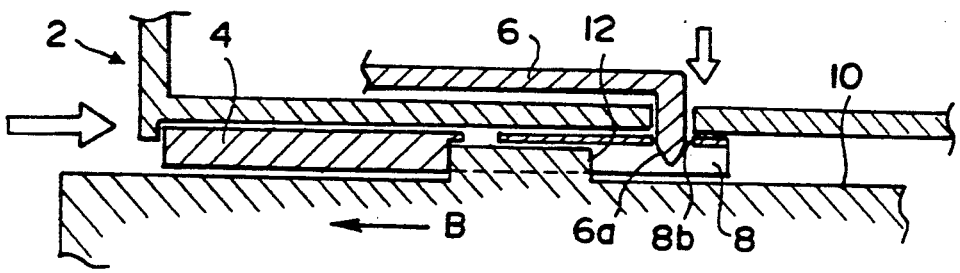

When the DAT cassette is completely inserted into the cassette deck, the slider member 4 reaches the open position and the locking projections 6a are brought into engagement with the second engaging holes 8b to hold the slider member 4 in the open position (FIG. 13C).

Figure 1:
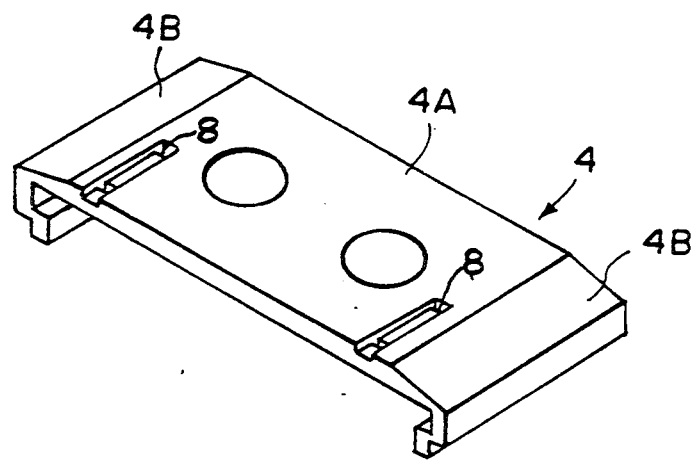
FIG. 1 is a perspective view as seen from its bottom showing a slider member of a DAT cassette in accordance with an embodiment of the present invention.
Figure 2:
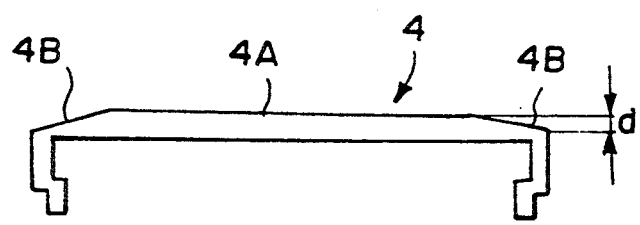
FIG. 2 is a front view of the slider member.

Now, a DAT cassette in accordance with an embodiment of the present invention will be described with reference to FIGS. 1 and 2. In FIGS. 1 and 2 and the other drawings, the parts analogous to those shown in FIGS. 11 to 13c are given the same reference numerals and will not be described here.

The DAT cassette of this embodiment is substantially the same as the conventional DAT cassette shown in FIG. 11 in the basic structure and operation. The DAT cassette of this embodiment differs from the conventional DAT cassette in that the bottom surface 4A of the slider member 4 which is opposed to the upper surface 10 of the cassette deck on which the lock release projections 12 are provided is cut obliquely at each side edge portion thereof from a portion close to the guide groove 8 on the outer side thereof to the side edge, whereby an inclined surface 4B is formed on each side edge portion of the slider member 4. The difference in height between the central portion and the edge of the slider member 4 (indicated at d in FIG. 2) may be not larger than 0.2 mm in the case of DAT cassettes which are in wide use at present.

Figure 3:
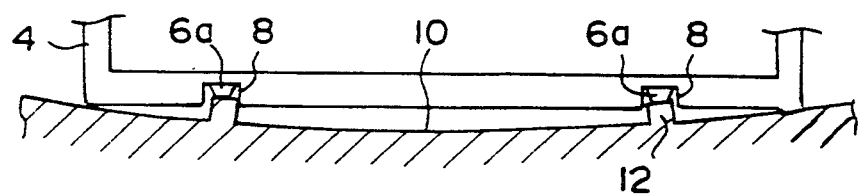
FIG. 3 is a fragmentary front view of the slider member for illustrating a drawback of the conventional DAT cassette.

Generally the surface 10 of the cassette deck is designed to be flat. However, the upper surface 10 sometimes can be concave in the direction of width of the DAT cassette for some reason of production. In such a case, if the bottom surface 4A of the slider member 4 is flat over the entire width thereof as in the conventional DAT cassette, both side portions of the slider member 4 ride on the side portions of the surface 10 as shown in FIG. 3 and the distance between the locking projections 6a and the lock release projections 12 is enlarged, whereby the locking projections 6a cannot be lifted by an amount sufficient to disengage the locking projections 6a from the first or second engaging holes 8a or 8b.

Figure 4:
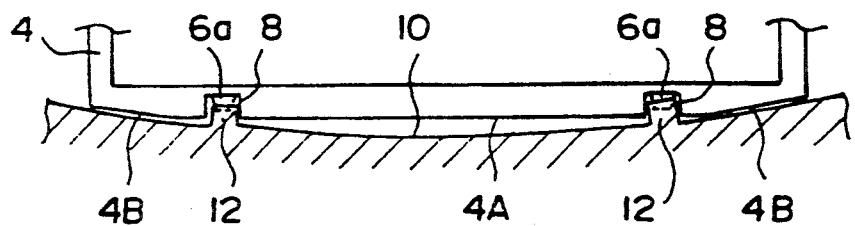
FIG. 4 is a view similar to FIG. 3 but for the DAT cassette of the embodiment.

On the other hand, in the case of the DAT cassette of this embodiment according to the present invention, the lock release projections 12 can successfully disengage the locking projections 6a from the first or second engaging holes 8a or 8b even if the surface 10 is concave, as shown in FIG. 4.

Though the inclined surfaces 4B shown in FIGS. 1 and 2 are flat, they may be concave or convex to some extent.

Figure 5:
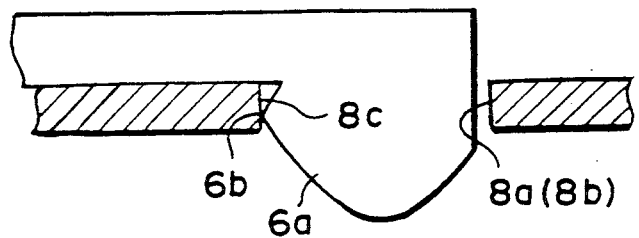
FIGS. 5 to 7 are fragmentary cross-sectional view respectively showing modifications of the DAT cassette of the embodiment.

It is preferred that each of the locking projections 6a has an abutment point 6b which abuts against the wall surface 8c of the engaging hole 8a or 8b at an intermediate portion as viewed in the direction of the depth of the engaging hole and the surface of the locking projection 6a inclines away from the wall surface 8c of the engaging hole inward thereof on upper and lower sides of the abutment point 6b as shown in FIG. 5.

Figure 8:
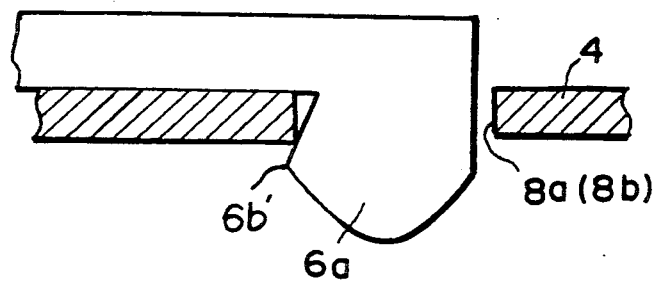
FIG. 8 is a view similar to FIGS. 5 to 7 but for illustrating a drawback of the conventional DAT cassette.

Conventionally the locking projection is designed to abut against the wall surface of the engaging hole at the lower edge 6b' thereof as shown in FIG. 8, and accordingly, the locking projection 6a can be caught by the edge of the engaging hole. When locking projection 6a abuts against the wall surface 8c of the engaging hole 8a or 8b at an intermediate portion as viewed in the direction of the depth of the engaging hole, the locking projection 6a cannot be caught by the edge of the engaging hole.

Figure 6:
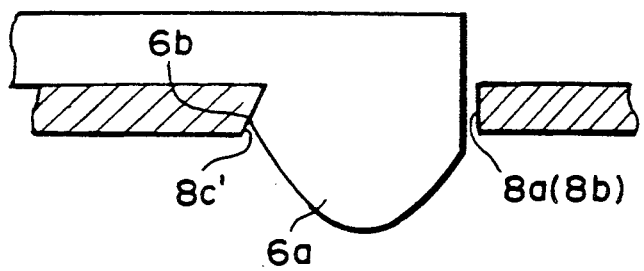

If desired, the wall surface of the engaging hole may be inclined inward as shown in FIG. 6 where the wall surface is indicated at 8c' in FIG. 6.

Figure 7:
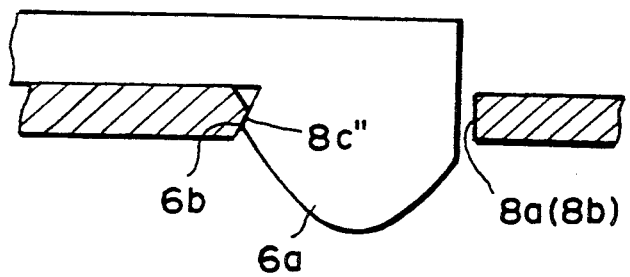

Further the wall surface of the engaging hole may be inclined inward at an intermediate portion thereof and outward at the upper edge portion thereof as shown in FIG. 7 where the wall surface is indicated at 8c''. When the wall surface of the engaging hole is inclined outward as shown in FIG. 7, the locking projection 6a can be smoothly brought into engagement with the engaging hole.

Figure 9:
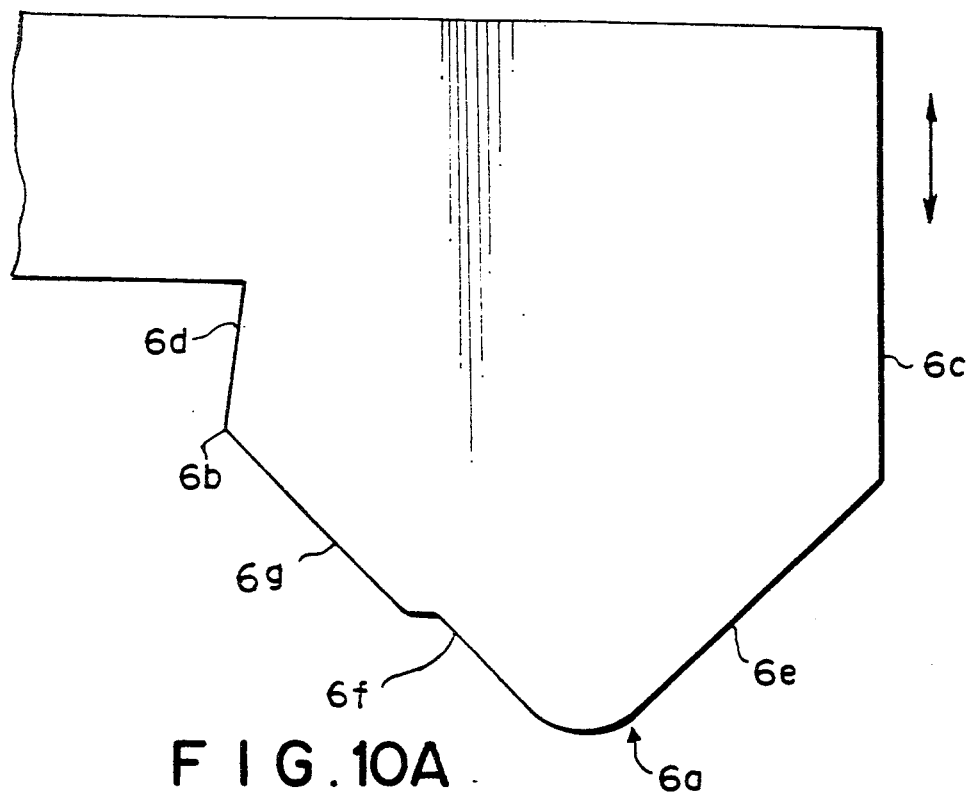
FIG. 9 is an enlarged fragmentary side view showing in more detail the locking projection shown in FIGS. 5 to 7.

FIG. 9 shows in more detail the locking projection 6a shown in FIGS. 5 to 7.

As shown in FIG. 9, the locking projection 6a has a substantially vertical front end face 6c, a rear end face 6d which extends upwardly inwardly from the abutment point 6b, a front tip surface 6e which is inclined at about 45° to the front end face 6c, and a rear tip face 6f which is at about 90° to the front tip face 6e and has a step 6g at an intermediate portion thereof. This arrangement is advantageous in that the locking projection 6a can be smoothly engaged with and disengaged from the engaging hole since the tip portion is inclined at about 45° both forward and rearward.

Figure 10A:
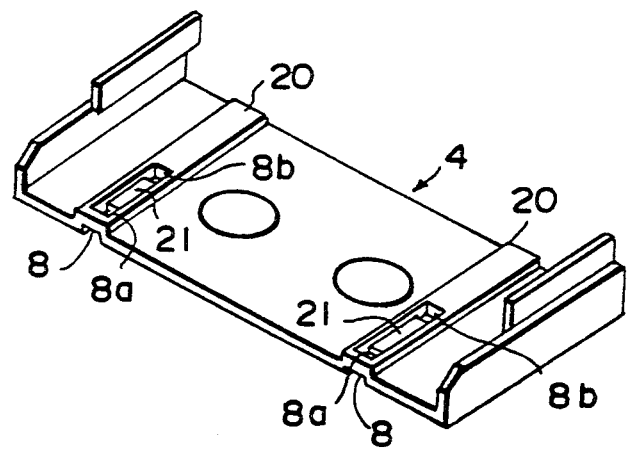
FIG. 10A is a perspective view showing the inside of a slider member of a DAT cassette in accordance with another embodiment of the present invention.
Figure 10B:
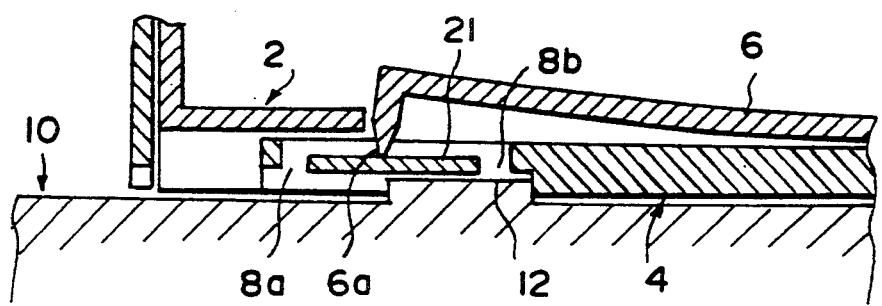
FIG. 10B is a cross-sectional view for illustrating the operation of the DAT cassette shown in FIG. 10A.

Now, a DAT cassette in accordance with another embodiment of the present invention will be described with reference to FIGS. 10A and 10B.

The DAT cassette of this embodiment is substantially the same as the conventional DAT cassette shown in FIG. 11 in the basic structure and operation. The DAT cassette of this embodiment differs from the conventional DAT cassette in that the slider member 4 is provided with a pair of protrusions 20 on the side opposed to the casing body 2. The protrusions 20 extend along the guide grooves 8 from the leading end to the trailing end of the slider member 4. The first and second engaging holes 8a and 8b open to the upper surfaces of the protrusions 20. Each protrusion 20 is recessed at the portion 21 between the first and second engaging holes 8a and 8b.

The protrusions 20 reduce the contact area between the slider member 4 and the casing body 2, thereby reducing the sliding resistance of the slider member 4. However in the conventional DAT cassette having such protrusions, the upper surfaces of the protrusions are flat and accordingly, the locking projections 6a must be lifted by a longer distance than in the DAT cassette not having such a protrusion, which increases the contact pressure between the locking projections and the upper surface of the slider member 4 and increases the sliding resistance of the slider member 4. In the DAT cassette of this embodiment, the recessed portions 21 reduce the contact pressure between the locking projections and the upper surface of the slider member 4 and thereby reduce the sliding resistance of the slider member 4 as can be understood from FIG. 10B.

What is claimed is:

1. A magnetic tape cassette having a cassette casing (1) and a magnetic tape accommodated in the casing, said casing comprising a casing body (2) and a slider member (4) mounted for sliding motion between a closed position and an open position, said slider member having a pair of guide grooves (8) formed on an outer surface thereof remote from the casing body and extending from a first end of the slider member toward another, opposite end thereof, each of said guide grooves having first and second engaging holes (8a, 8b) formed on a bottom of said guide groove, extending through said slider member, open to an inner surface thereof, and spaced from each other in a longitudinal direction of said guide groove, said casing body being provided with a pair of locking projections (6a) each of which is resiliently urged toward one of said guide grooves from the inner surface of said slider member and is adapted to be selectively engaged with said first and second engaging holes so that a tip portion thereof projects into said guide groove, said locking projections holding said slider member in the closed position when they are engaged with said first engaging holes (8a) and holding said slider member in said open position when they are engaged with said second engaging holes (8b), and said locking projections being disengaged from said engaging holes by a pair of lock release projections (12) provided on a surface of a magnetic recording and/or reproducing system and sliding along said guide grooves when said magnetic tape cassette is loaded in said magnetic recording and/or reproducing system, wherein said outer surface (4A) of said slider member which is opposed to an upper surface of said magnetic recording and/or reproducing system on which said lock release projections are provided is cut obliquely on opposite sides thereof from positions close to and outwardly of said guide grooves to respective side edges, to define an inclined surface (4B) on opposite sides of said outer surface of said slider member.

2. A magnetic tape cassette as defined in claim 1, in which each of said locking projections has an abutment point (6b) which abuts against a wall surface (8c) of each of said engaging holes at an intermediate position as viewed in a direction of the depth of said engaging hole, and a surface of said locking projection inclines away from said wall surface of said engaging hole inwardly thereof on upper and lower sides of said abutment point.

3. A magnetic tape cassette as defined in claims 1 or 2, further comprising a pair of protrusions (20) formed on the inner surface of said slider member and extending along said respective guide grooves, said engaging holes opening to upper surfaces of said protrusions, each of said protrusions being recessed at a portion (21) between said first and second engaging holes on which said locking projection slides when said slider member slides between said closed position and said open position, to attendantly reduce the force exerted by the locking projections against the slider member.

4. A magnetic tape cassette having a cassette casing (1) and a magnetic tape accommodated in the casing, said casing comprising a casing body (2) and a slider member (4) mounted for sliding motion between a closed position and an open position, said slider member having a pair of guide grooves (8) formed on an outer surface thereof remote from the casing body and extending from a first end of the slider member toward another, opposite end thereof, each of said guide grooves having first and second engaging holes, (8a, 8b) formed on a bottom of said guide groove, extending through said slider member, open to an inner surface thereof, and spaced from each other in a longitudinal direction of said guide groove, said casing body being provided with a pair of locking projections (6a) each of which is resiliently urged toward one of said guide grooves from said inner surface of said slider member and is adapted to be selectively engaged with said first and second engaging holes so that a tip portion thereof projects into said guide groove, said locking projections holding said slider member in said closed position when they are engaged with said first engaging holes (8a) and holding said slider member in said open position when they are engaged with said second engaging holes (8b), and said locking projections being disengaged from said engaging holes by a pair of lock release projections (12) provided on a surface of a magnetic recording and/or reproducing system and sliding along said guide grooves when said magnetic tape cassette is loaded in said magnetic recording and/or reproducing system, wherein each of said locking projections has an abutment point (6b) which abuts against a wall surface (8c) of each of said engaging holes at an intermediate position as viewed in a direction of the depth of said engaging hole, and a surface of said locking projection inclines away from said wall surface of said engaging hole inwardly thereof on upper and lower sides of said abutment point.

5. A magnetic tape cassette as defined in claim 4 further comprising a pair of protrusions, (20) formed on the inner surface of said slider member and extending along said respective guide grooves, said engaging holes opening to upper surfaces of said protrusions, each of said protrusions being recessed at a portion (21) between said first and second engaging holes on which said locking projection slides when said slider member slides between said closed position and said open position, to attendantly reduce the force exerted by the locking projections against the slider member.

6. A magnetic tape cassette having a cassette casing (1) and a magnetic tape accommodated in the casing, said casing comprising a casing body (2) and a slider member (4) mounted for sliding motion between a closed position and an open position, said slider member having a pair of guide grooves (8) formed on an outer surface thereof remote from the casing body and extending from a first end of the slider member toward another, opposite end thereof, each of said guide grooves having first and second engaging holes, (8a, 8b) formed on a bottom of said guide groove, extending through said slider member, open to an inner surface thereof and spaced from each other in a longitudinal direction of said guide groove, said casing body being provided with a pair of locking projections (6a) each of which is resiliently urged toward one of said guide grooves from said inner surface of said slider member and is adapted to be selectively engaged with said first and second engaging holes so that a tip portion thereof projects into said guide groove, said locking projections holding said slider member in said closed position when they are engaged with said first engaging holes (8a) and holding said slider member in said open position when they are engaged with said second engaging holes (8b), and said locking projections being disengaged from said engaging holes by a pair of lock release projections (12) provided on a surface of a magnetic recording and/or reproducing system and sliding along said guide grooves when said magnetic tape cassette is loaded in said magnetic recording and/or reproducing system, wherein a pair of protrusions 20 are formed on the inner surface of said slider member and extend along said respective guide grooves, said engaging holes opening to upper surfaces of said protrusions, each of said protrusions being recessed at a portion (21) between said first and second engaging holes on which said locking projection slides when said slider member slides between said closed position and said open position, to attendantly reduce the force exerted by the locking projections against the slider member.

* * * * *